US012482065B2

(12) United States Patent
Avishai et al.

(10) Patent No.: US 12,482,065 B2
(45) Date of Patent: Nov. 25, 2025

(54) LEARNING BASED BAD PIXEL CORRECTION

(71) Applicant: SAMSUNG ELECTRONICS CO., LTD., Suwon-si (KR)

(72) Inventors: Igal Avishai, Tel-Aviv (IL); Gal Bitan, Tel-Aviv (IL); Roy Yam, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 768 days.

(21) Appl. No.: 17/657,171

(22) Filed: Mar. 30, 2022

(65) Prior Publication Data

US 2023/0316471 A1 Oct. 5, 2023

(51) Int. Cl.
*G06T 5/20* (2006.01)
*G06T 9/00* (2006.01)
(Continued)

(52) U.S. Cl.
CPC .................. *G06T 5/20* (2013.01); *G06T 9/00* (2013.01); *G06V 10/22* (2022.01); *G06V 10/762* (2022.01);
(Continued)

(58) Field of Classification Search
CPC .......... G06F 18/23; G06T 2207/20081; G06T 2207/20084; G06T 5/20; G06T 5/60;
(Continued)

(56) References Cited

U.S. PATENT DOCUMENTS

| 5,675,513 A | 10/1997 | Hammer |
| 6,104,839 A | 8/2000 | Cok et al. |

(Continued)

FOREIGN PATENT DOCUMENTS

| CN | 102055917 | 5/2011 |
| EP | 1594308 | 11/2005 |

OTHER PUBLICATIONS

Celestre, et al., "A novel algorithm for bad pixel detection and correction to improve quality and stability of geometric measurements", Journal of Physics: Conference Series 772 (2016) 012002, 8 pages.
(Continued)

*Primary Examiner* — Kenny A Cese
(74) *Attorney, Agent, or Firm* — Morgan, Lewis & Bockius LLP

(57) ABSTRACT

Methods and apparatuses for correcting bad image pixels are described. The described sensor-independent image processing techniques leverage one or more dynamic dictionaries of learned filters for bad pixel correction (e.g., where a camera leverages such dictionaries to efficiently identify filters to accurately adjust and correct bad pixel values). For example, a dictionary may store filters that are learned offline (via a self-supervised learning algorithm implemented at a server using known images and ground truth bad pixel correction values). To select a filter for a bad pixel correction operation, a camera may encode an image patch surrounding a bad pixel (into an encoded patch descriptor) and search the dictionary for a matching patch descriptor key. The camera may then apply the filter (value) corresponding to the searched patch descriptor (key) of the dictionary to the image patch to correct the bad pixel and generate a corrected output image.

13 Claims, 11 Drawing Sheets

(51) Int. Cl.
  *G06V 10/22* (2022.01)
  *G06V 10/762* (2022.01)
  *G06V 10/774* (2022.01)
  *G06V 10/778* (2022.01)
  *H04N 23/80* (2023.01)

(52) U.S. Cl.
  CPC ........ *G06V 10/7747* (2022.01); *G06V 10/778* (2022.01); *H04N 23/80* (2023.01); *G06T 2207/20081* (2013.01)

(58) Field of Classification Search
  CPC .. G06T 5/77; G06T 9/00; G06V 10/22; G06V 10/24; G06V 10/30; G06V 10/762; G06V 10/7747; G06V 10/778; H04N 23/80
  USPC ........................................................ 382/275
  See application file for complete search history.

(56) References Cited

U.S. PATENT DOCUMENTS

| | | | |
|---|---|---|---|
| 6,614,946 B1 | 9/2003 | Edgar et al. | |
| 7,683,948 B2 | 3/2010 | Yanof et al. | |
| 8,576,309 B2 | 11/2013 | Hashizume | |
| 9,275,463 B2* | 3/2016 | Nanri | G06T 5/70 |
| 10,825,149 B2 | 11/2020 | Schafer et al. | |
| 10,885,627 B2 | 1/2021 | Min et al. | |
| 2001/0036305 A1 | 11/2001 | Jun | |
| 2009/0245575 A1 | 10/2009 | Hu | |
| 2012/0133804 A1 | 5/2012 | Kim | |
| 2015/0312442 A1* | 10/2015 | Higashi | H04N 19/182 382/266 |
| 2016/0086318 A1* | 3/2016 | Hannuksela | G06T 5/50 348/43 |
| 2017/0069071 A1* | 3/2017 | Jung | G06V 20/64 |
| 2020/0065945 A1 | 2/2020 | Schafer et al. | |
| 2020/0118250 A1* | 4/2020 | Takahama | H04N 25/60 |
| 2020/0396442 A1 | 12/2020 | Shin | |
| 2021/0048753 A1* | 2/2021 | Zhang | G03F 7/70441 |
| 2021/0256661 A1* | 8/2021 | Takada | G06V 10/751 |
| 2022/0139072 A1* | 5/2022 | Klaiman | G06V 10/764 382/159 |

OTHER PUBLICATIONS

Tanbakuchi, et al., "Adaptive pixel defect correction", Proceedings vol. 5017, Sensors and Camera Systems for Scientific, Industrial, and Digital Photography Appplications IV; (2003), https://doi.org/10.1117/12.499223, 12 pages.

Felker, "Correcting Image Anomalies Using Machine Learning", Technical Disclosure Commons, (Dec. 12, 2017), 36 pages.

Tajbakhsh, "Efficient defect pixel cluster detection and correction for Bayer CFA image sequences", Proceedings of SPIE—The International Society of Optical Engineering 7876 DOI:10.1117/12.876783, Jan. 2011, 10 pages.

Dierickx, et al., "Missing pixel correction algorithm for image sensors", Proceedings of SPIE—The International Society for Optical Engineering—Jun. 1999, 6 pages.

Guo, et al., "Salt and Pepper Noise Removal with Multi-Class Dictionary Learning and L0 Norm Regularizations", Algorithms, Published: Dec. 25, 2018, 14 pages.

* cited by examiner

LEARNING BASED BAD PIXEL CORRECTION

BACKGROUND

The following relates generally to image processing, and more specifically to learning based bad pixel correction.

The use of image capture devices, which may include still image cameras, moving image cameras or other electronic devices that include cameras or image sensors, has rapidly increased in recent years along with advancements in camera technology. For example, mobile communication terminals, such as cell phones, smart phones, portable computers, tablet computers, and other similar electronic devices may commonly include digital cameras. Further, higher quality and less expensive cameras are available to consumers and camera users due to such advancements in camera technology.

With advancements in digital camera technology, existing analog camera functions have been digitized, and the scope of digital camera technology has been expanded to a variety of new fields. Digital cameras may use image sensors (e.g., to capture images) and image signal processors (e.g., to process the captured images). For instance, an image signal processor performs tasks on image output features such as image sharpening, noise reduction, and color control. As pixel quantities of image sensors increase, image processing speed and accuracy becomes more important. Efficient image processing techniques for improving the quality of images generated by a camera are desired.

SUMMARY

A method, apparatus, non-transitory computer readable medium, and system for learning based bad pixel correction are described. One or more aspects of the method, apparatus, non-transitory computer readable medium, and system include receiving an image including a bad pixel; identifying a patch of pixels surrounding the bad pixel; generating a patch descriptor corresponding to the patch; selecting a patch descriptor key corresponding to the patch descriptor from a plurality of patch descriptor keys in a dictionary; identifying a filter corresponding to the patch descriptor key using the dictionary; and correcting the bad pixel by applying the filter to the patch.

A method, apparatus, non-transitory computer readable medium, and system for learning based bad pixel correction are described. One or more aspects of the method, apparatus, non-transitory computer readable medium, and system include generating descriptors for each of a plurality of patches in a set of images; clustering the plurality of patches based on the descriptors to obtain a plurality of patch clusters; identifying a patch descriptor key corresponding to each of the plurality of patch clusters; generating a filter for each of the plurality of patch clusters; and generating a dictionary associating the patch descriptor key and the filter.

An apparatus, system, and method for learning based bad pixel correction are described. One or more aspects of the apparatus, system, and method include a patch selection component configured to select a patch surrounding a bad pixel in an image; a dictionary component configured to identify a filter corresponding to a patch descriptor key based on the patch; and a patch correction component configured to correct the bad pixel by applying the filter to the patch.

DETAILED DESCRIPTION

Figure 1:
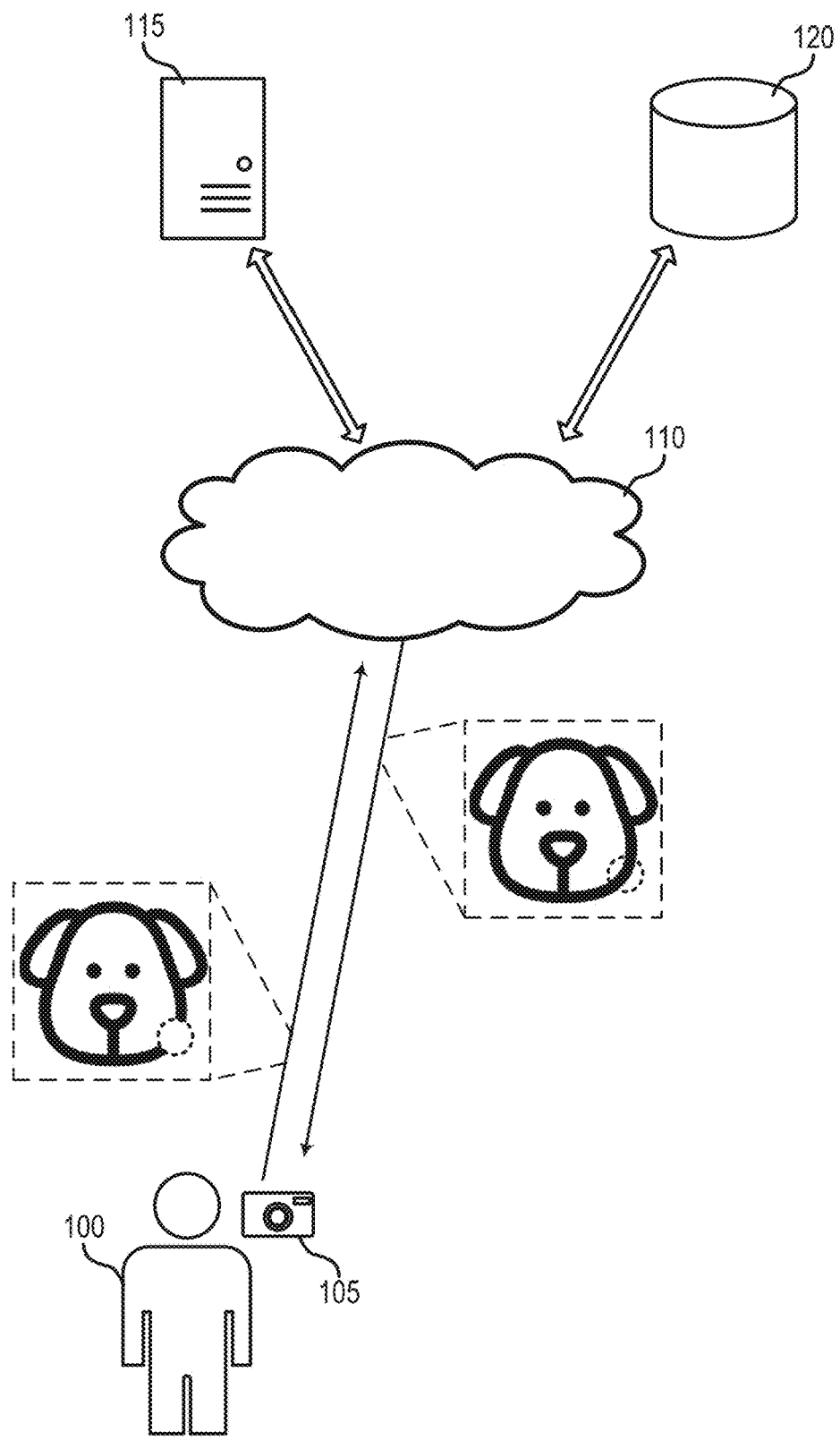
FIG. 1 shows an example of an image processing system according to aspects of the present disclosure.

Digital cameras may use image sensors (e.g., to capture images) and image signal processing techniques (e.g., to process the captured images). As an example, pixel correction in digital photography may refer to a method used to correct one or more bad pixels. Generally, a bad pixel may include any pixel of an image sensor that does not produce a reliable sampling of the camera's field of view. For instance, bad pixels may include or refer to static bad pixels (e.g., bad pixels produced during sensor manufacturing that malfunction or do not operate properly), dynamic bad pixels (e.g., malfunctioning pixels produced due to heat generation), auto-focus pixels (e.g., pixels with values that are adjusted in accordance with auto-focus operations), etc.

Pixel correction methods may adjust the values of such bad pixels to more accurately represent the real world objects of the captured image. In other words, pixel correction may include adjusting bad pixels such that a corrected image with corrected pixel values seem more accurate to an average observer. In order to perform a pixel correction, a variety of algorithms and methods may be used by cameras, such as naive interpolation of surrounding pixels. However, such techniques may result in various undesirable artifacts (e.g., such as broken lines, low resolution, etc.).

The present disclosure describes sensor-independent (color filter array (CFA)-independent) and hardware feasible bad pixel correction techniques that leverage one or more dynamic dictionaries of learnable filters (e.g., where a camera leverages such dictionaries to efficiently identify filters to accurately adjust and correct bad pixel values). For example, a dictionary may store filters that are learned offline (via a self-supervised learning algorithm implemented at a server using known images and ground truth bad pixel correction values). In some aspects, a dictionary may be established offline by taking known images and creating training data (e.g., by masking pixel information) for learning sensor-independent filters. In other words, filters may be estimated to minimize the error between an estimated pixel correction and a ground truth pixel correction, where parameters of the filters are updated throughout the learning process. Leveraging known images (e.g., ground truth pixel correction) in the training process results in a dictionary of sensor-independent filters for bad pixel correction techniques that may be implemented in real time on camera hardware.

For a bad pixel correction operation, a camera may search the dictionary for a filter to apply to an image patch surrounding the bad pixel (e.g., such that the camera may output a corrected image with the pixel value adjusted based on applying the filter). For instance, the dictionary (e.g., the dictionary learned offline) may include 'key:value' pairs comprising pairs of patch descriptor keys and corresponding filter values. To select a filter for a bad pixel correction operation, a camera may encode an image patch surrounding a bad pixel (into an encoded patch descriptor) and search the dictionary for a matching patch descriptor key. The camera may then apply the filter (value) corresponding to the searched patch descriptor (key) of the dictionary to the image patch to correct the bad pixel and generate a corrected output image. That is, a camera may select and apply the filter corresponding to the 'patch descriptor key: filter value' pair of the dictionary identified by the camera (e.g., where the identified 'patch descriptor key: filter value' pair matches the encoded patch descriptor of the image patch including the bad pixel).

As such, bad pixels in captured images may be efficiently corrected in real time on camera hardware, independent of the camera's sensor type. Moreover, the techniques and apparatuses described herein may more accurately correct bad pixel values of images captured by a camera, while reducing computation and memory requirements of the cameras performing bad pixel correction (e.g., such that details of objects in captured images are more efficiently preserved, compared to conventional pixel correction techniques). That is, by applying the unconventional step of training and learning a filter dictionary offline, memory and computation requirements of the camera may be reduced while achieving improved bad pixel correction performance (e.g., as computational intensive operations may be performed offline, and memory demands for leveraging such dictionaries may be limited to 'key:value' pairs of the dictionary, which may be stored in camera memory).

Embodiments of the present disclosure may be used in the context of an image processing system. For example, a camera apparatus based on the present disclosure may leverage one or more dictionaries of filters learned offline (e.g., dictionaries learned and trained offline via a server) according to techniques described herein. An example of an application of the inventive concept in the image processing context is provided with reference to FIGS. 1 through 4. Details regarding the architecture of an example bad pixel correction system are provided with reference to FIGS. 5 and 6. Examples of offline processes (e.g., processes performed off camera, such as at a server or other image processing apparatus) for bad pixel correction are provided with reference to FIGS. 7 and 8. One or more aspects of online (e.g., on camera) processes for bad pixel correction are described with reference to FIGS. 9 through 11.

Image Processing System

FIG. 1 shows an example of an image processing system according to aspects of the present disclosure. The example shown includes user 100, device 105 (e.g., a camera), cloud 110, server 115, and database 120. In some examples, a user 100 may use a device 105 that may be in communication with a server 115 (e.g., via cloud 110). Device 105 is an example of, or includes aspects of, the corresponding element described with reference to FIG. 5. Server 115 is an example of, or includes aspects of, the corresponding element described with reference to FIG. 6. In some examples, as described in more detail below, an image processing system implementing the techniques described herein may be implemented solely on a single device (e.g., such as on a device 105). For example, one or more aspects of offline dictionary generation may be represented by the cloud 110, server 115, and database 120, and a device 105 may be manufactured and may integrate the generated dictionary (e.g., a device 105, in some examples, may not be in communication with the cloud 110, server 115, and database 120.

In the example of FIG. 1, device 105 may correct an image (e.g., of a dog) including a bad pixel to output a corrected image with the bad pixel adjusted to a corrected value (e.g., such that the image of the dog does not include undesirable artifacts, such as broken lines, that may otherwise arise from bad pixels of the device 105).

According to the techniques described herein, the system for image processing shown in FIG. 1 may be implemented for accurate, real-time correction of bad pixels in a captured (e.g., or received) image. As described in more detail herein, such techniques may be implemented at a reduced computational load (e.g., a computational load that may be processed by, or used in, cost-limited or power-limited devices). For instance, as described in more detail herein (e.g., with reference to FIGS. 6-8), computationally intensive operations for generating advanced filter dictionaries may be performed offline, and camera online computation requirements and memory demands for leveraging such dictionaries may be limited (e.g., to storing and searching 'key:value' pairs of the dictionary, which may be stored in camera memory, efficiently processed via camera hardware, etc.).

A computing device 105 is a personal computer, laptop computer, mainframe computer, palmtop computer, personal assistant, mobile device 105, or any other suitable processing apparatus. A device 105 may include an optical instrument (e.g., an image sensor, camera, etc.) for recording or capturing images, which may be stored locally, transmitted to another location, etc. For example, an image sensor may capture visual information using one or more photosensitive elements that may be tuned for sensitivity to, for example, a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device 105. In a camera device 105, an image sensor may convert light incident on a camera lens into an analog or digital signal. An electronic device 105 may then display an image on a display panel based on the digital signal. Image sensors are commonly mounted on electronics such as smartphones, tablet personal computers (PCs), laptop PCs, and wearable devices 105. In some aspects, device 105 may include or refer to any 'on-sensor image signal processor (ISP) logic' (e.g., device 105 may be manufactured on a same piece of silicon as an image sensor).

A pixel (e.g., a pixel sensor) may store information about received electromagnetic radiation (e.g., light). Each pixel may include one or more photodiodes and one or more complementary metal oxide semiconductor (CMOS) transistors. A photodiode may receive a light and may output charges. The amount of output charges may be proportional to the amount of light received by the photodiode. CMOS transistors may output a voltage based on charges output from the photodiode. A level of a voltage output from a photodiode may be proportional to the amount of charges output from the photodiode. That is, a level of a voltage output from a photodiode may be proportional to the amount of light received by the photodiode.

A cloud 110 is a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud 110 networks have functions distributed over multiple locations from central servers 115. A server 115 is designated an edge server 115 if it has a direct or close connection to a user 100. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

A server 115 provides one or more functions to users 100 linked by way of one or more of the various networks. In some cases, the server 115 includes a single microprocessor board, which includes a microprocessor responsible for controlling all aspects of the server 115. In some cases, a server 115 uses microprocessor and protocols to exchange data with other devices 105/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server 115 is configured to send and receive hypertext markup language (HTML) formatted files (e.g., for displaying web pages). In various embodiments, a server 115 comprises a general purpose computing device 105, a personal computer, a laptop computer, a mainframe computer, a super computer, or any other suitable processing apparatus.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction. In some examples, one or more aspects of the described database 120 may be sored on the image sensor or on the device 120 itself.

In some examples, one or more aspects of techniques described herein may be implemented via hardware (e.g., as an application specific integrated circuit (ASIC)). In some examples, one or more aspects of techniques described herein may be implemented (e.g., via device 105, server 115, or both) using software. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

Figure 2:
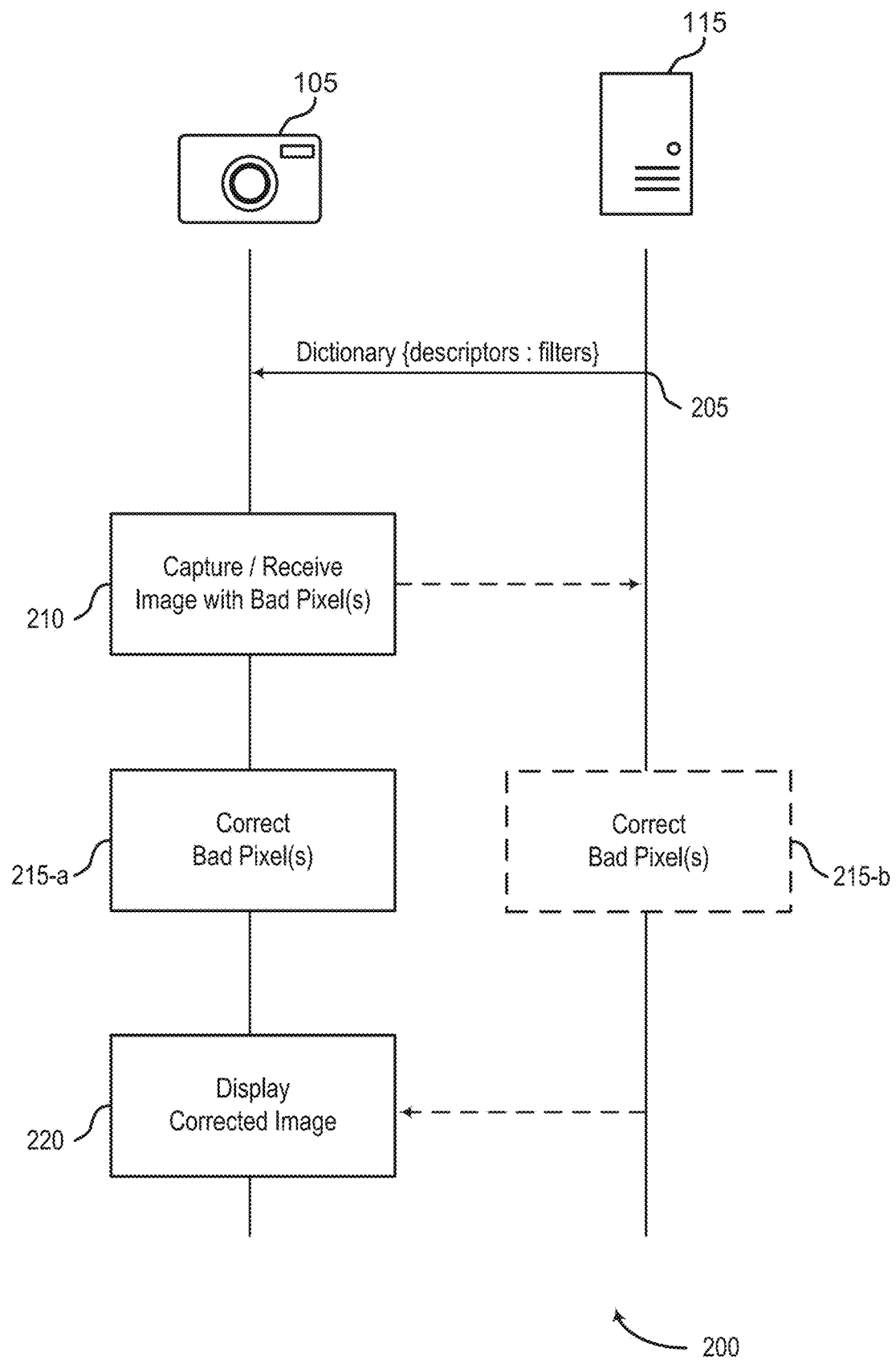
FIGS. 2 through 3 show examples of a process for image pixel correction according to aspects of the present disclosure.

FIG. 2 shows an example of a process 200 for image pixel correction according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The process 200 illustrates aspects of sensor-independent image processing techniques that leverage a dynamic dictionary of learned filters for bad pixel correction. For example, in FIG. 2, a device 105 (e.g., a camera) leverages a dictionary received from server 115 to efficiently identify a filter to apply to a pixel patch (e.g., to accurately adjust and correct a bad pixel value within the pixel patch). For example, a dictionary may store filters that are learned offline (via a self-supervised learning algorithm implemented at a server 115 using known images and ground truth bad pixel correction values). To select a filter for a bad pixel correction operation, a device 105 may encode an image patch surrounding a bad pixel (into an encoded patch descriptor) and the device 105 may search the dictionary for a matching patch descriptor key. The device 105 may then apply the filter (value) corresponding to the searched patch descriptor (key) of the dictionary to the image patch to correct the bad pixel and generate a corrected output image.

Generally any aspects of the described techniques may be performed at the server 115, at the device 105, or both. For instance, in the example of FIG. 2, aspects of bad pixel correction techniques described herein (e.g., offline bad pixel correction techniques) may be described as being performed at server (e.g., server 115), where a device (e.g., device 105) may be connected to the server via a cloud. In FIG. 2, solid lines show an example where device 105 performs (e.g., online) bad pixel correction techniques leveraging a dictionary received from a server 115. Further, dashed lines in FIG. 2 show an example where device 105 may capture an image and send the image to the server 115 (e.g., and the server 115 performs (online) bad pixel correction techniques and sends a corrected image back to the device 105).

In other examples, a device 105 itself may implement one or more aspects of offline bad pixel correction techniques. For instance, a device 105 may generate a dictionary offline and, when capturing or receiving images, the device 105 may perform online bad pixel correction operations using the stored dictionary that we previously generated offline.

In FIG. 2, at operation 205, the system provides a dictionary to a camera, where the dictionary includes 'key: value' pairs of image patch descriptors (keys) and filters (values). In some cases, the operations of this step refer to, or may be performed by, server as described with reference to FIGS. 1 and 6. In some cases, the operations of this step refer to, or may be performed by, offline dictionary component as described with reference to FIG. 6.

At operation 210, the system captures (e.g., or receives) an image including at least one bad pixel. In some cases, the operations of this step refer to, or may be performed by, camera as described with reference to FIG. 5. In some cases, the operations of this step refer to, or may be performed by, device as described with reference to FIGS. 1 and 5.

At operation 215, the system corrects the at least one bad pixel (e.g., based on the filter dictionary provided by the server). In some cases, the operations of this step refer to, or may be performed by, camera as described with reference to FIG. 5. In some cases, the operations of this step refer to, or may be performed by, patch correction component as described with reference to FIG. 5.

At operation 220, the system displays the corrected image (e.g., the image with a filter applied to patch(es) surrounding the at least one bad pixel). In some cases, the operations of this step refer to, or may be performed by, camera as described with reference to FIG. 5. In some cases, the operations of this step refer to, or may be performed by, display as described with reference to FIG. 5.

Figure 3:
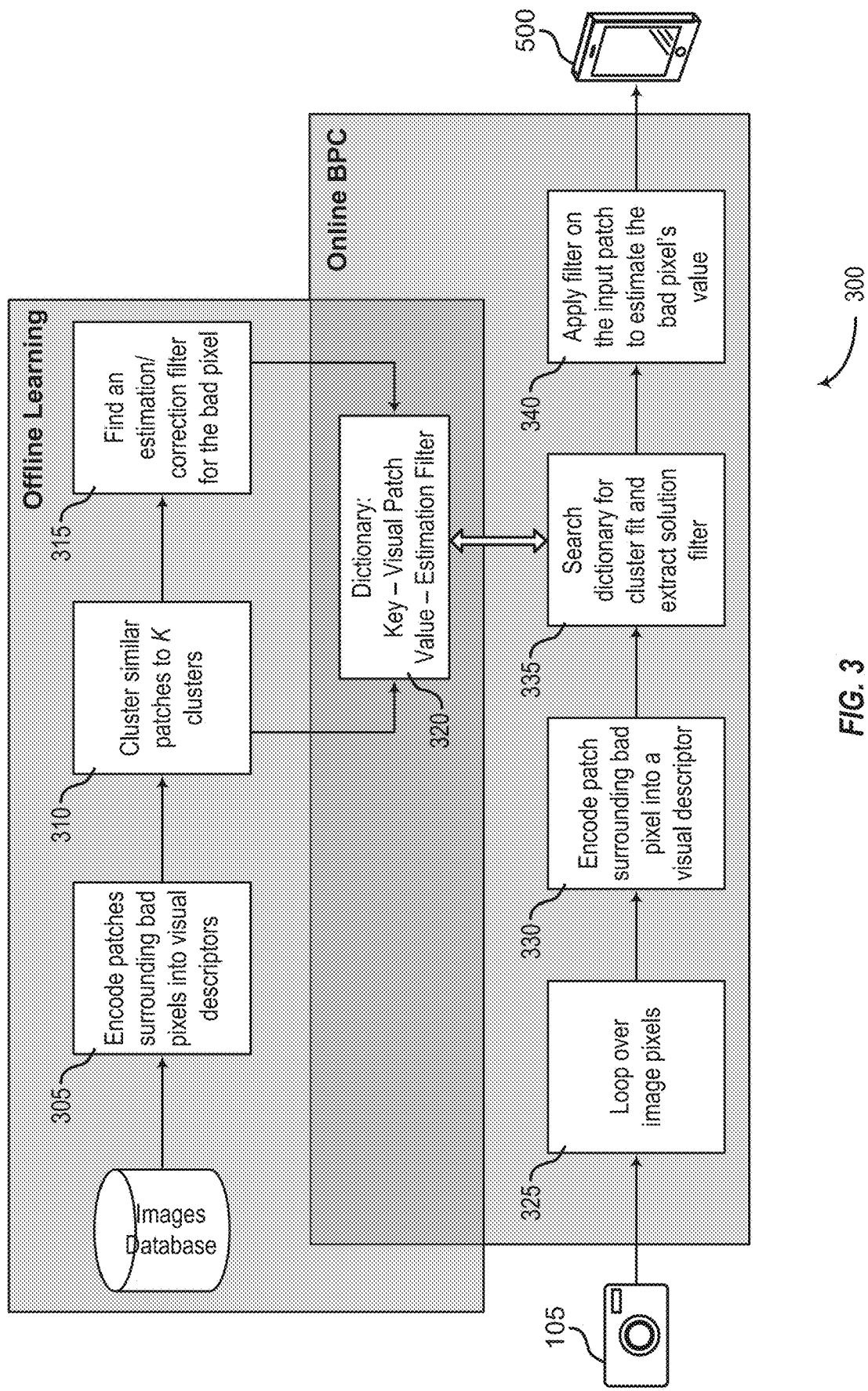

FIG. 3 shows an example system 300 for image pixel correction according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Bad pixels in image sensors generally include all pixels which do not produce a reliable sampling of the camera's field of view. For instance, in addition to static bad pixels and dynamic bad pixels, Auto Focus pixels may also be considered as bad pixels for the purpose of getting a complete image from the sensor. In order to get better Auto Focus performance, image capture and image processing systems may increase the number of auto focus pixels. Moreover, in order to increase manufacturing yield, the acceptance of more defected pixels on each sensor may be allowed. However, as the number of auto focus pixels and defected pixels increase, and as sensor layout differs in time (Bayer, Quad-Bayer/TetraCell, NonaCell, RYYB, etc.), convenient (e.g., efficient) techniques for correcting such bad pixels and for enabling quick and easy adaptation to different sensor pixels layouts may be desired.

The present disclosure provides pixel array independent bad pixel correction apparatuses and techniques. For instance, non-CFA specific, hardware feasible implementations of bad pixels correction in an any CFA image is described using one or more dynamic dictionaries of learnable filters. The apparatuses and techniques described herein may be applicable to various technical fields (e.g., such as computer vision and image processing for hardware implementation, such as application specific integrated circuits (ASICs), field programmable gate arrays (FPGAs), etc.).

Physical signals (e.g., such as audio or images) have repeating features. As such, aspects of the described techniques may assume that, when looking at a small environment in an image that is newly introduced, the small environment may be matched to a similar size environment that has already been seen in a database. That is, an image patch surrounding a bad pixel in a captured image may be matched to a similar size environment learned and stored in a database. In other words, an image patch surrounding a bad pixel may be encoded into a patch descriptor, and the patch descriptor may be matched to a patch descriptor key (learned through generation of an offline dictionary).

In some aspects, bad pixels and AF pixels may be predetermined (e.g., marked in advance, known by the sensor after manufacturing and testing, etc.). Moreover, other bad pixels may not to be considered when applying filters on the image.

A 'key:value' pair may refer to a fundamental (e.g., basic) data representation in computing applications and computing systems. For instance, an open-ended data structure may be designed to allow for future extension of the data structure without requiring modification of existing code or data. Some or all of the data model may be expressed as a collection of 2-tuples in the form of a 'key:value' pair (e.g., <key, value> with each element being a key—value pair).

During an offline learning process (e.g., operations 305, 310, 315, and 320), a dictionary may be created in which keys of the dictionary are vectors that describe a small image patches (e.g., 5×5 pixels, 7×7, etc.), and values of the dictionary are filters (e.g., filters of the same dimensions as the image patches). As described herein, one or more aspects of the offline learning process may generally be performed on, or implemented by, a server, a device, or both (e.g., as described in more detail herein, for example, with reference to FIG. 2). In some aspects, the images database may be an example of database 120 described with reference to FIG. 1).

At operation 305, the system encodes patches surrounding bad pixels to patch descriptors (e.g., patch descriptor vectors). In some cases, the operations of this step refer to, or may be performed by, server as described with reference to FIGS. 1 and 6. In some cases, the operations of this step refer to, or may be performed by, filter training component as described with reference to FIG. 6.

At operation 310, the system clusters similar patches to a number of clusters. In some cases, the operations of this step refer to, or may be performed by, server as described with reference to FIGS. 1 and 6. In some cases, the operations of this step refer to, or may be performed by, filter training component as described with reference to FIG. 6.

At operation 315, the system finds an estimation/correction filter (e.g., for the bad pixels in the center of patches of the cluster). In some cases, the operations of this step refer to, or may be performed by, server as described with reference to FIGS. 1 and 6. In some cases, the operations of this step refer to, or may be performed by, filter training component as described with reference to FIG. 6.

In some aspects, at operation 320, the system establishes (e.g., offline) a dictionary with 'key:value' pairs corresponding to patch descriptors and a filter associated with each patch descriptor. In some cases, the operations of this step refer to, or may be performed by, server as described with reference to FIGS. 1 and 6. In some cases, the operations of this step refer to, or may be performed by, offline dictionary component as described with reference to FIG. 6.

During an online process (e.g., during online bad pixel correction operations, such as operations 325, 330, 335, and 340) a learned filter of a similar image patch may be applied in order to estimate the bad pixel (e.g., the center pixel of the patch) and correct the bad pixel. In some aspects, online processes may be performed, for example, in real-time, independently by the device, performed without direct communication with a server or cloud, etc.

At operation 325, the system loops over image pixels of a captured (e.g., or received) image. For instance, a camera may loop over an entire image and identify image patches surrounding a bad pixel, upon detecting or identifying a bad pixel (e.g., which in some cases may be known by the camera in advance based on the sensor type, the manufacturing defects of the sensor, sensor testing, etc.). In some cases, the operations of this step refer to, or may be performed by, device as described with reference to FIGS. 1 and 5. In some cases, the operations of this step refer to, or may be performed by, patch selection component as described with reference to FIG. 5.

At operation 330, the system encodes a patch surrounding a bad pixel into a patch descriptor. In some cases, the operations of this step refer to, or may be performed by, device as described with reference to FIGS. 1 and 5. In some cases, the operations of this step refer to, or may be performed by, descriptor component as described with reference to FIG. 5.

At operation 335, the system searches the dictionary for a cluster fit (e.g., for a patch descriptor key closest to the encoded patch descriptor), and the system extracts a filter (e.g., an associated filter value) based on the identified patch descriptor key corresponding to the encoded patch descriptor. In some cases, the operations of this step refer to, or may be performed by, device as described with reference to FIGS. 1 and 5. In some cases, the operations of this step refer to, or may be performed by, dictionary component as described with reference to FIG. 5.

At operation 340, the system applies the filter on the patch surrounding the bad pixel (e.g., the image patch identified based on looping over the image pixels) to estimate the bad pixels value (e.g., to correct the bad pixel by applying the filter to the patch surrounding the bad pixel).

Figure 4:
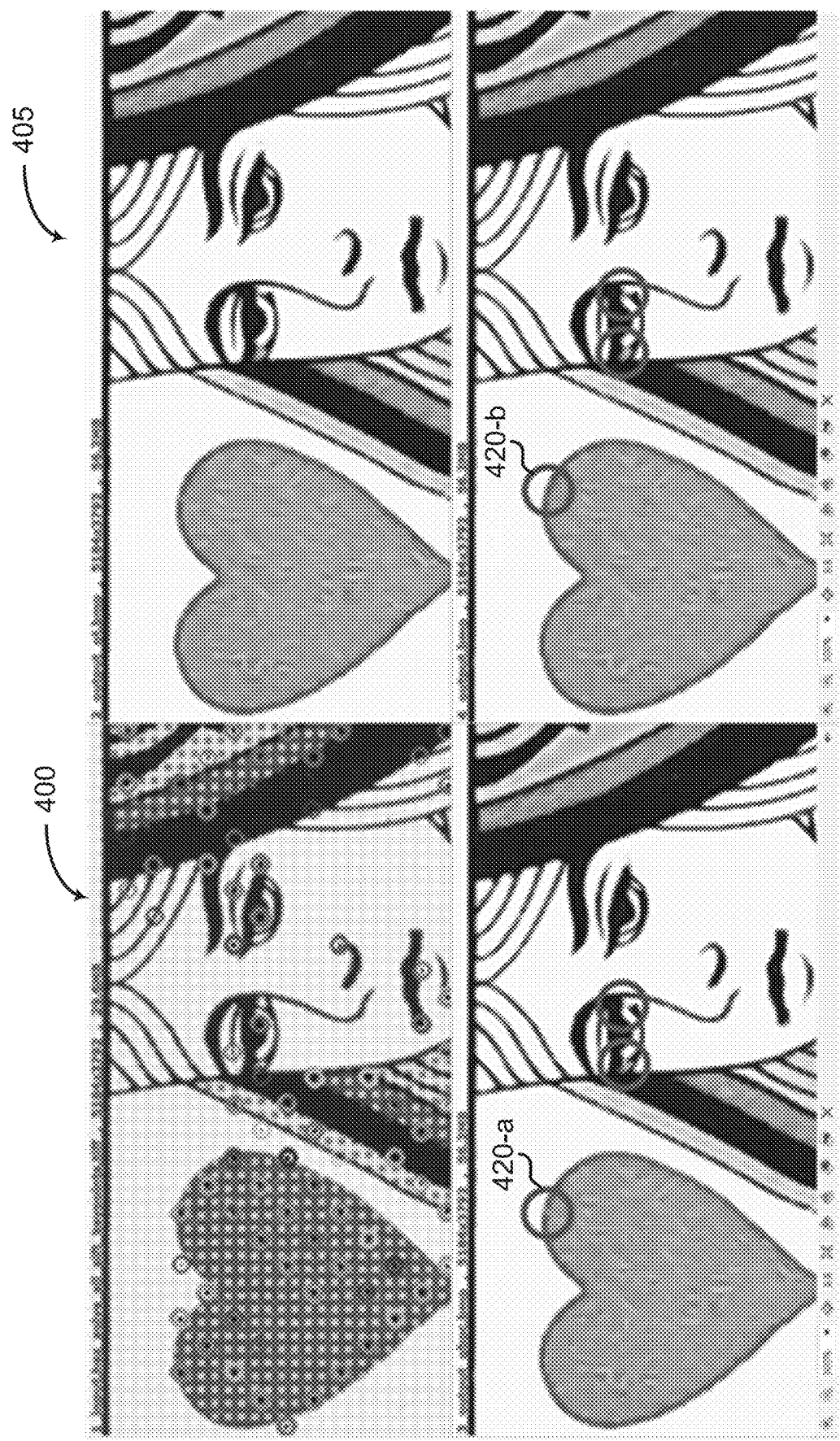
FIG. 4 shows an example of pixel correction according to aspects of the present disclosure.

FIG. 4 shows an example of pixel correction according to aspects of the present disclosure. The example shown includes first image representation 400, second image representation 405, third image representation 410, fourth image representation 415, and pixel correction points 420. For example, pixel correction points 420 may be depicted by circles in the example of FIG. 4.

First image representation 400 may illustrate identification of a number of bad pixels in an original image. Second image representation 405 may illustrate a ground truth image (e.g., an image used during an offline dictionary generation process). Third image representation 410 may illustrate an example of a corrected image of other image processing techniques (e.g., image processing techniques not implementing aspects of the present disclosure). Fourth image representation 415 may illustrate results from learning based bad pixel correction, according to techniques described herein.

For example, third image representation 410 includes an example pixel correction point 420-*a* that includes a bad pixel adjustment using conventional techniques that results in broken lines. In contrast, fourth image representation 415 includes example pixel correction point 420-*b* that includes an improved bad pixel adjustment using one or more aspects of the techniques described herein, which reduces undesirable image processing artifacts such as the broken lines shown in third image representation 410. In other words, based on second image representation 405 being used as a ground truth image to learn filters and generate an offline dictionary, fourth image representation 415 shows bad pixel correction techniques described herein which leverage such dictionaries. Conversely, third image representation 410 may illustrate an example where offline learned dictionary-based techniques are not implemented, and pixel correction point 420-*a* is not corrected as accurately.

Bad Pixel Correction System Architecture

Figure 5:
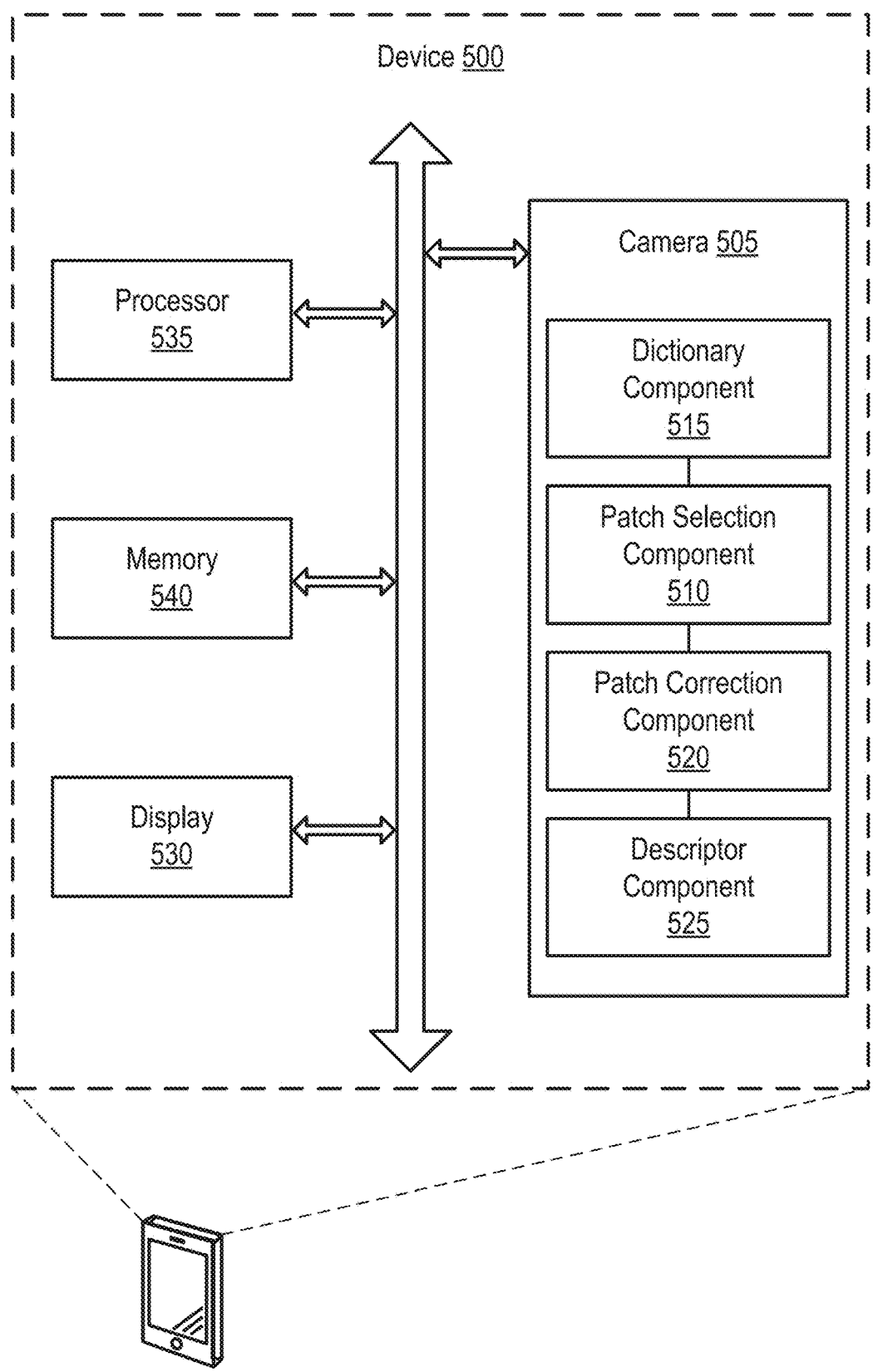
FIG. 5 shows an example of an image processing apparatus according to aspects of the present disclosure.

FIG. 5 shows an example of an image processing apparatus according to aspects of the present disclosure. Device 500 is an example of, or includes aspects of, the corresponding element described with reference to FIG. 1. In one aspect, device 500 includes camera 505, processor 535, memory 540, and display 530.

According to some aspects, camera 505 (e.g., an image sensor as described in more detail herein, for example, with reference to FIG. 1) receives an image including a bad pixel. In some examples, camera 505 captures the image with a camera 505. According to some aspects, camera 505 is configured to capture the image. In one aspect, camera 505 includes patch selection component 510, dictionary component 515, patch correction component 520, and descriptor component 525.

According to some aspects, patch selection component 510 identifies a patch of pixels surrounding the bad pixel. In some examples, patch selection component 510 identifies a set of bad pixels in the image. According to some aspects, patch selection component 510 is configured to select a patch surrounding a bad pixel in an image.

According to some aspects, dictionary component 515 selects a patch descriptor key corresponding to the patch descriptor from a set of patch descriptor keys in a dictionary. In some examples, dictionary component 515 identifies a filter corresponding to the patch descriptor key using the dictionary. In some examples, dictionary component 515 compares the patch descriptor to each of the set of patch descriptor keys in the dictionary to obtain a similarity value for each of the patch descriptor keys in the dictionary, where the similarity value includes a distance between the patch descriptor and a corresponding patch descriptor key. In some examples, dictionary component 515 identifies the patch descriptor key based on the similarity value.

According to some aspects, dictionary component 515 generates a descriptor for the patch, where the similarity value includes a distance between the patch descriptor and a patch descriptor key from the dictionary. According to some aspects, dictionary component 515 is configured to identify a filter corresponding to a patch descriptor key based on the patch.

According to some aspects, patch correction component 520 corrects the bad pixel by applying the filter to the patch. In some examples, patch correction component 520 generates a corrected image by correcting each of the set of bad pixels. According to some aspects, patch correction component 520 is configured to correct the bad pixel by applying the filter to the patch.

According to some aspects, descriptor component 525 generates a patch descriptor corresponding to the patch. In some examples, descriptor component 525 encodes pixel values of the patch to obtain the patch descriptor. According to some aspects, descriptor component 525 is configured to generate a descriptor for the patch, wherein the patch descriptor key is selected based on the descriptor.

According to some aspects, display 530 presents the corrected image to a user. A display 530 may comprise a conventional monitor, a monitor coupled with an integrated display 530, an integrated display 530 (e.g., an LCD display 530), or other means for viewing associated data or processing information. Output devices 500 other than the display 530 can be used, such as printers, other computers or data storage devices 500, and computer networks.

A processor 535 is an intelligent hardware device 105, (e.g., a general-purpose processing component, a digital signal processor (DSP), a central processing unit (CPU), a graphics processing unit (GPU), a microcontroller, an ASIC, a FPGA, a programmable logic device, a discrete gate or transistor logic component, a discrete hardware component, or any combination thereof). In some cases, the processor 535 is configured to operate memory 540 (e.g., a memory array using a memory controller). In other cases, a memory controller is integrated into the processor 535. In some cases, the processor 535 is configured to execute computer-readable instructions stored in a memory to perform various functions. In some embodiments, a processor 535 includes special purpose components for modem processing, baseband processing, digital signal processing, or transmission processing.

Examples of memory 540 (e.g., a memory device) include random access memory (RAM), read-only memory (ROM), or a hard disk. Examples of memory devices include solid state memory and a hard disk drive. In some examples, memory 540 is used to store computer-readable, computer-executable software including instructions that, when executed, cause a processor to perform various functions described herein. In some cases, the memory 540 contains, among other things, a basic input/output system (BIOS) which controls basic hardware or software operation such as the interaction with peripheral components or devices. In some cases, a memory controller operates memory cells of memory 540. For example, a memory controller can include a row decoder, column decoder, or both. In some cases, memory cells within a memory store information in the form of a logical state.

Figure 6:
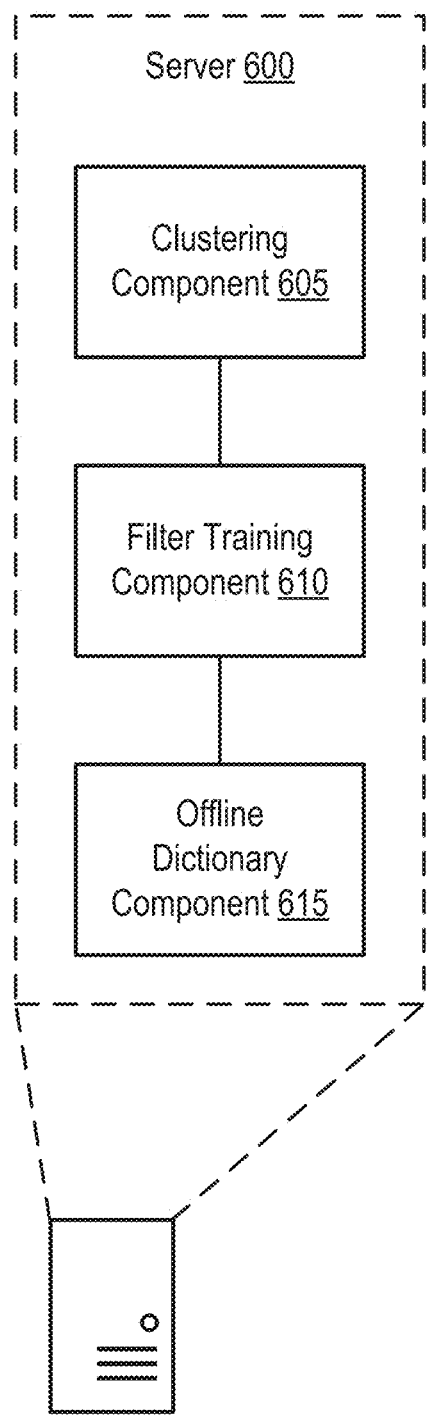
FIG. 6 shows an example of a server according to aspects of the present disclosure.

FIG. 6 shows an example of a server 600 according to aspects of the present disclosure. Server 600 is an example of, or includes aspects of, the corresponding element described with reference to FIG. 1. In one aspect, server 600 includes clustering component 605, filter training component 610, and offline dictionary component 615.

According to some aspects, clustering component 605 clusters the set of patches based on the descriptors to obtain a set of patch clusters. According to some aspects, clustering component 605 is configured to cluster a plurality of patches to obtain a plurality of patch clusters, wherein the patch descriptor key corresponds to one of the plurality of patch clusters.

According to some aspects, filter training component 610 generates a training patch descriptor for each of a set of patches in a set of training images. In some examples, filter training component 610 clusters the set of patches based on the training patch descriptor to obtain a set of patch clusters. In some examples, filter training component 610 identifies the set of patch descriptor keys in the dictionary based on the set of patch clusters. In some aspects, the patch descriptor key includes a representative image patch or a descriptor of the representative image patch for a corresponding cluster of the set of patch clusters. In some examples, filter training component 610 performs a self-supervised learning algorithm on a cluster corresponding to the patch descriptor key to obtain the filter. In some examples, filter training component 610 applies the filter to one or more patches in a corresponding cluster from the set of patch clusters to obtain a predicted pixel for each of the one or more patches. In some examples, filter training component 610 compares the predicted pixel to an actual pixel in a corresponding patch of the one or more patches. In some examples, filter training component 610 updates the filter based on the comparison.

According to some aspects, filter training component 610 performs a supervised learning algorithm on each of the set of patch clusters to obtain the corresponding filter. In some examples, filter training component 610 applies the filter to one or more patches in a corresponding cluster from the set of patch cluster to obtain a predicted pixel for each of the one or more patches. In some examples, filter training component 610 compares the predicted pixel to an actual pixel in a corresponding patch of the one or more patches. In some examples, filter training component 610 updates the filter based on the comparison. According to some aspects, filter training component 610 is configured to perform a self-supervised learning algorithm on a cluster of patches corresponding to the patch descriptor key to obtain the filter.

According to some aspects, offline dictionary component 615 generates descriptors for each of a set of patches in a set of images. In some examples, offline dictionary component 615 identifies a patch descriptor key corresponding to each of the set of patch clusters. In some examples, offline dictionary component 615 generates a filter for each of the set of patch clusters. In some examples, offline dictionary component 615 generates a dictionary associating the patch descriptor key and the filter.

In some examples, server 600 may include or implement one or more aspects of a neural network. A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

In some examples, server 600 may include or implement one or more aspects of a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

As described herein, filter training component 610 performs a supervised learning algorithm on each of the set of patch clusters to obtain the corresponding filter. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

In some cases, server 600 may include one or more processors, memory, etc. (e.g., which may be example of, or include aspects of, the corresponding components described with reference to FIG. 5).

Offline Bad Pixel Correction Techniques

Figure 7:
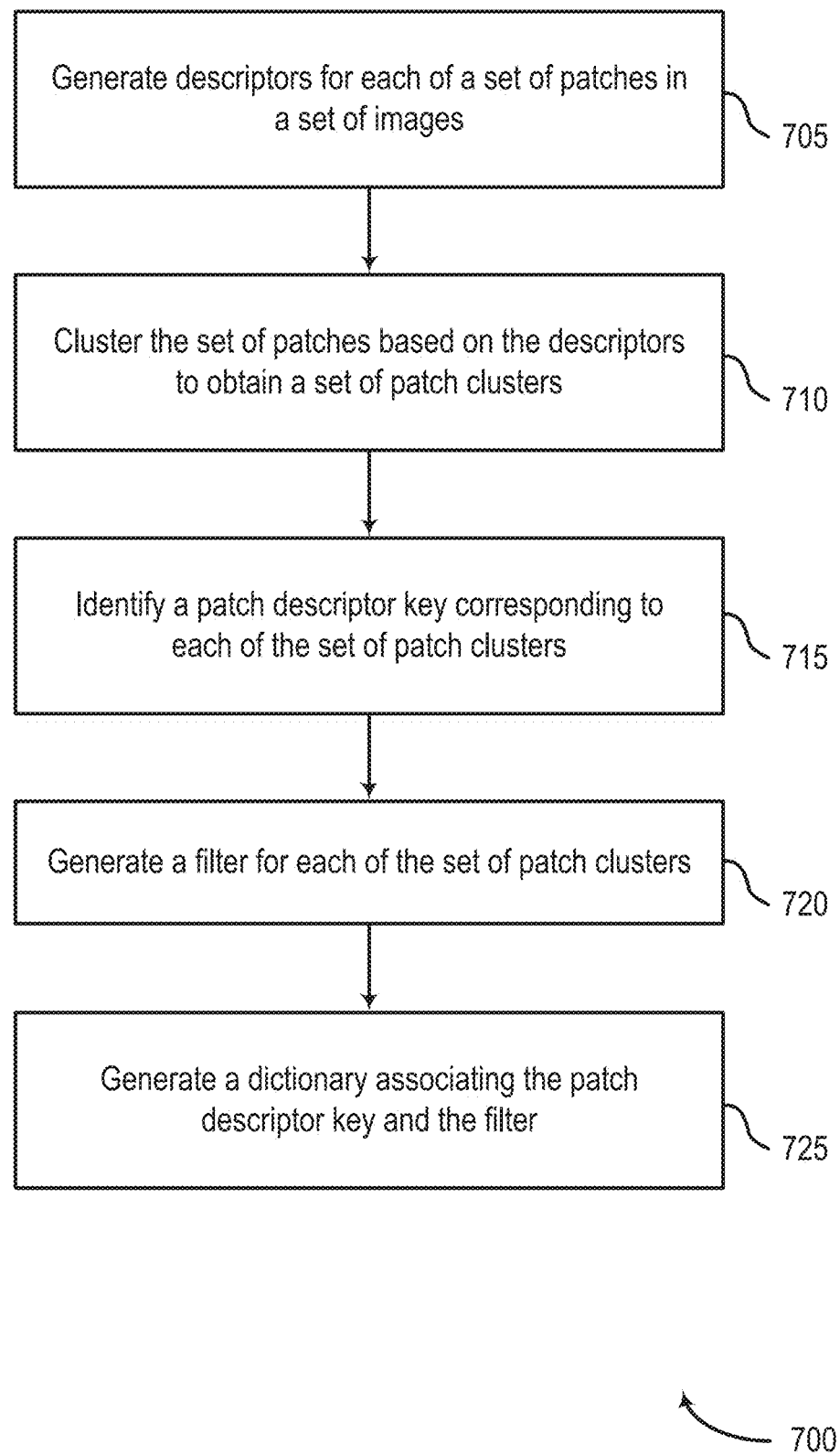
FIG. 7 shows an example of a process for image processing according to aspects of the present disclosure.

FIG. 7 shows an example of a method 700 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for learning based bad pixel correction is described. One or more aspects of the method include generating descriptors for each of a plurality of patches in a set of images; clustering the plurality of patches based on the descriptors to obtain a plurality of patch clusters; identifying a patch descriptor key corresponding to each of the plurality of patch clusters; generating a filter for each of the plurality of patch clusters; and generating a dictionary associating the patch descriptor key and the filter.

For example, at operation 705, the system generates descriptors for each of a set of patches in a set of images. In some cases, the operations of this step refer to, or may be performed by, offline dictionary component as described with reference to FIG. 6.

At operation 710, the system clusters the set of patches based on the descriptors to obtain a set of patch clusters. In some cases, the operations of this step refer to, or may be performed by, clustering component as described with reference to FIG. 6.

At operation 715, the system identifies a patch descriptor key corresponding to each of the set of patch clusters. In some cases, the operations of this step refer to, or may be performed by, offline dictionary component as described with reference to FIG. 6.

At operation 720, the system generates a filter for each of the set of patch clusters. In some cases, the operations of this step refer to, or may be performed by, offline dictionary component as described with reference to FIG. 6.

At operation 725, the system generates a dictionary associating the patch descriptor key and the filter. In some cases, the operations of this step refer to, or may be performed by, offline dictionary component as described with reference to FIG. 6.

Moreover, an apparatus, non-transitory computer readable medium, and system for learning based bad pixel correction is described. One or more aspects of the apparatus, non-transitory computer readable medium, and system include generating descriptors for each of a plurality of patches in a set of images; clustering the plurality of patches based on the descriptors to obtain a plurality of patch clusters; identifying a patch descriptor key corresponding to each of the plurality of patch clusters; generating a filter for each of the plurality of patch clusters; and generating a dictionary associating the patch descriptor key and the filter.

Some examples of the method, apparatus, non-transitory computer readable medium, and system further include performing a supervised learning algorithm on each of the plurality of patch clusters to obtain the corresponding filter.

Some examples of the method, apparatus, non-transitory computer readable medium, and system further include applying the filter to one or more patches in a corresponding cluster from the plurality of patch cluster to obtain a predicted pixel for each of the one or more patches. Some examples further include comparing the predicted pixel to an actual pixel in a corresponding patch of the one or more patches. Some examples further include updating the filter based on the comparison.

Some examples of the method, apparatus, non-transitory computer readable medium, and system further include receiving an image including a bad pixel. Some examples further include identifying a patch of pixels surrounding the bad pixel. Some examples further include selecting the patch descriptor key corresponding to a cluster resembling the patch, where the patch descriptor key is selected from a plurality of patch descriptor keys in the dictionary. Some examples further include identifying the filter corresponding to the patch descriptor key using the dictionary. Some examples further include correcting the bad pixel by applying the filter to the patch.

Some examples of the method, apparatus, non-transitory computer readable medium, and system further include comparing the patch to each of the plurality of patch descriptor keys in the dictionary to obtain a similarity value for each of the patch descriptor keys in the dictionary. Some examples further include identifying the patch descriptor key based on the similarity value.

Some examples of the method, apparatus, non-transitory computer readable medium, and system further include generating a descriptor for the patch, wherein the similarity value comprises a distance between the patch descriptor and a patch descriptor key from the dictionary.

Figure 8:
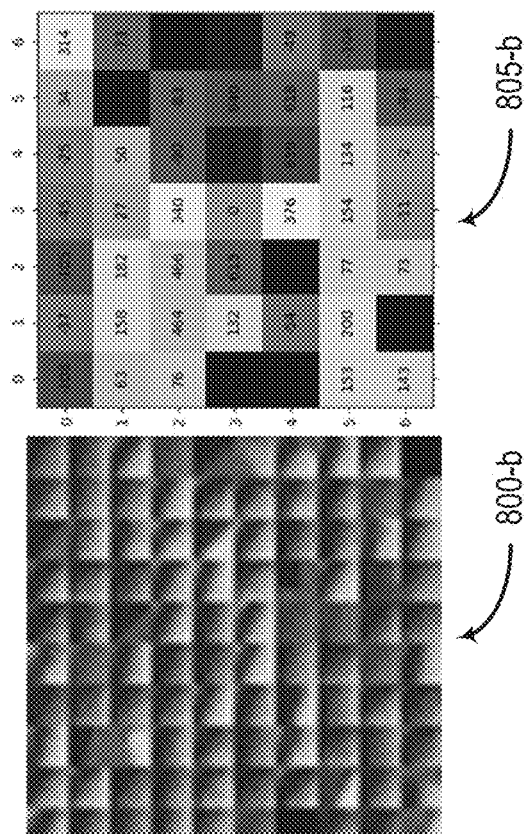
FIG. 8 shows an example of aspects of a 'key:value' pair diagram according to aspects of the present disclosure.
Figure 8:
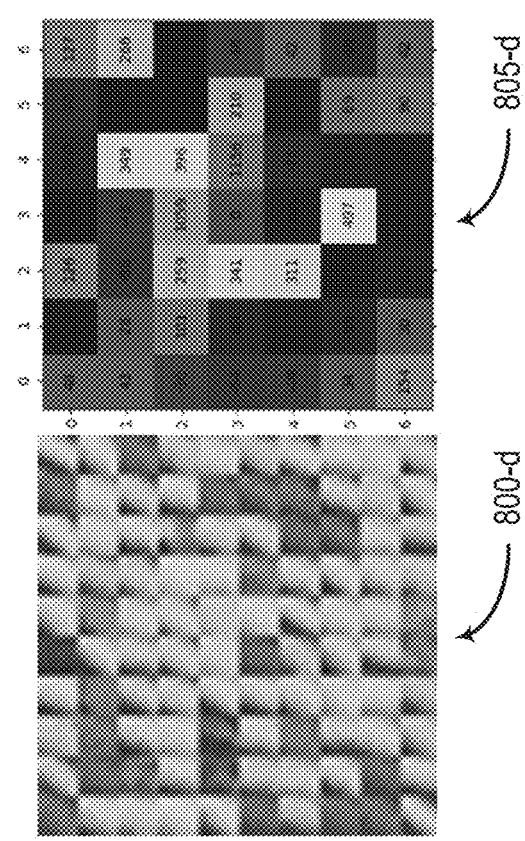
Figure 8:
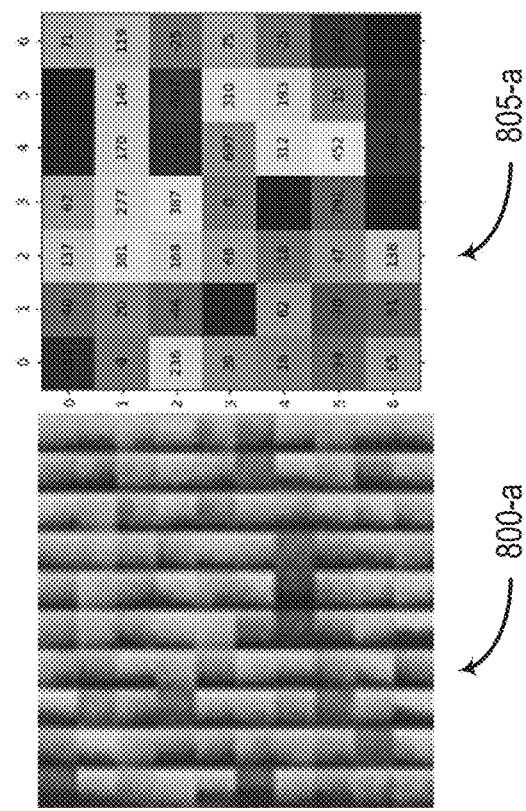
Figure 8:
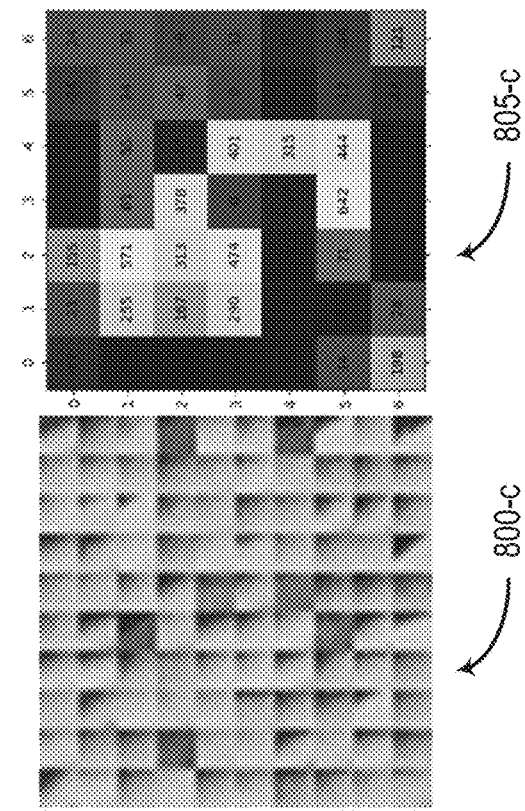

FIG. 8 shows an example of aspects of a 'key:value' pair diagram according to aspects of the present disclosure. The example shown includes cluster mosaics 800 and estimation filters 805.

The example of FIG. 8 shows cluster mosaics 800 (e.g., clusters of 100 similar 7×7 image patches) and a corresponding estimation filter 805. For instance, cluster mosaic 800-a, cluster mosaic 800-b, cluster mosaic 800-c, and cluster mosaic 800-d may each illustrate a cluster of different corresponding similar image patches (e.g., where the image patches are taken from known image data to be used for training/filter learning). During the learning process (described in more detail herein), estimation filter 805-a, estimation filter 805-b, estimation filter 805-c, and estimation filter 805-d may be respectively learned for cluster mosaic 800-a, cluster mosaic 800-b, cluster mosaic 800-c, and cluster mosaic 800-d. Accordingly, when a device (e.g., a camera) captures an image and encodes the image into a patch descriptor, the device may leverage the learned dictionary (e.g., to identify one of estimation filter 805-a, estimation filter 805-b, estimation filter 805-c, and estimation filter 805-d based on matching the encoded patch descriptor to one or more patch descriptors corresponding to one of cluster mosaic 800-a, cluster mosaic 800-b, cluster mosaic 800-c, and cluster mosaic 800-d).

Offline Learning—Unsupervised Clustering

During an offline learning process (e.g., for learning filters to generate a learned filter dictionary for bad pixel correction described herein), similar patches (e.g., 7×7 patches in the example of FIG. 8) may be clustered, where the similar patches exclude the center pixel of the patches (e.g., as the center pixel is designated to correspond to a bad pixel to be corrected during online bad pixel correction operations). In some examples, the clustered similar patches exclude any pixels corresponding to a bad pixel in a patch. For instance, known images may be used for training an offline dictionary, and similar patches of the known images may be clustered together to be used for filter learning.

For determining if two image patches are visually similar, descriptors may be used such that vectors are produced to symbolize these patches in such a way that their similarity (e.g., the vectors Euclidian distance) represents the visual difference between the patches. In some examples, descriptors may be generated via techniques such as DAISY, Scale-invariant feature transform (SIFT), Speeded Up Robust Features (SURF), etc.

The clustering process may be performed by applying an algorithm (e.g., a K-Means algorithm) on the descriptors which describe the image patches. In some examples, deep embedded clustering may be performed (e.g., by applying a NN that clusters image patches based on the image patches corresponding patch descriptors).

Offline Learning—Supervised Filter Learning

After establishing the different patterns in a dictionary (e.g., after establishing patch descriptor "keys" of the dictionary), the next step of generating the offline dictionary is to find a filter for each cluster (e.g., a filter that will give the best correction for image patches that fit or correspond to this cluster of known image patches).

For each of the patches used in the clustering stage (e.g., for each of the patches taken from known images used for training and learning), the center pixel, or any other bad pixel in the patch, (e.g., corresponding to a designated bad pixel) may be removed. For instance, after the clustering stage (e.g., during a filter design stage), the center pixel value(s) in clustered image patches may be used as the ground truth, and a filter may be learned to minimize the error between the estimated correction (e.g., from each filter during the learning process) and the ground truth.

There are different ways to perform the filter design stage, for example, such as random sample consensus (RANSAC), Least Squares Regression, with/without regularization, etc.

In the example of FIG. 8, it is shown that the center pixels of estimation filter 805-*a*, estimation filter 805-*b*, estimation filter 805-*c*, and estimation filter 805-*d* are not considered (e.g., the center pixels of the patches of the cluster mosaics and the filters are 'zeroed' or removed in accordance with the techniques described herein). In the example of FIG. 8, filter unity is 4096 (e.g., meaning shown pixel value is divided by 4096 to maintain the energy).

Online Bad Pixel Correction Techniques

Figure 9:
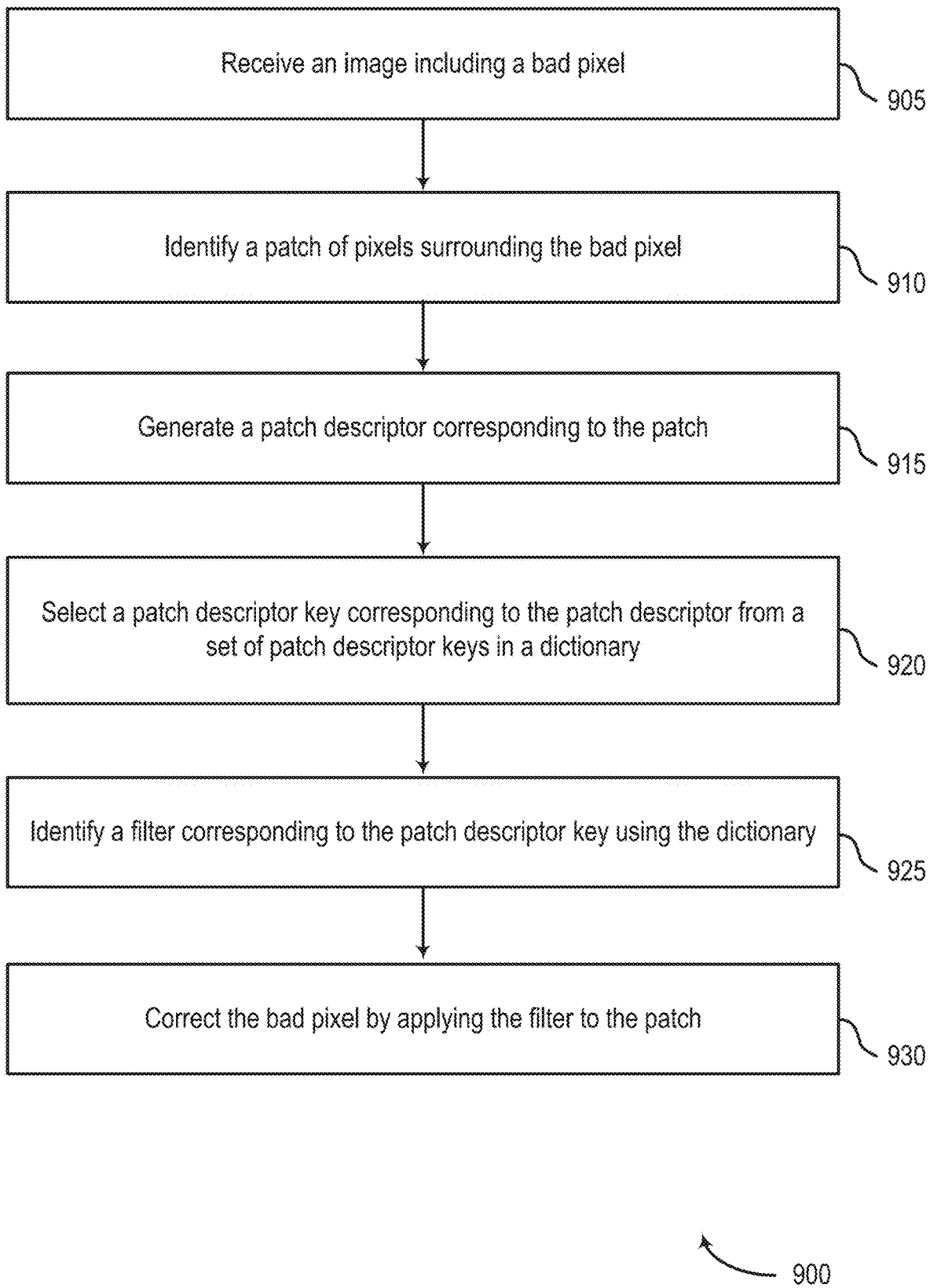
FIG. 9 shows an example of a process for image processing according to aspects of the present disclosure.

FIG. 9 shows an example of a method 900 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for learning based bad pixel correction is described. One or more aspects of the method include receiving an image including a bad pixel, identifying a patch of pixels surrounding the bad pixel, and generating a patch descriptor corresponding to the patch. One or more aspects of the method further include selecting a patch descriptor key corresponding to the patch descriptor from a plurality of patch descriptor keys in a dictionary, identifying a filter corresponding to the patch descriptor key using the dictionary, and correcting the bad pixel by applying the filter to the patch.

At operation 905, the system receives an image including a bad pixel. For instance, a system may capture an image using an image sensor or a camera, or the system may receive an image from another device. In some cases, the operations of this step refer to, or may be performed by, camera as described with reference to FIG. 5.

At operation 910, the system identifies a patch of pixels surrounding the bad pixel. For example, a camera may "loop" over image pixels and identify patches surrounding bad pixels (e.g., including static bad pixels, dynamic bad pixels, auto focus pixels, etc. In some examples, bad pixels may be known by the system in advance (e.g., based on known sensor manufacturing defects, known auto focus pixels, etc.). In some cases, the operations of this step refer to, or may be performed by, patch selection component as described with reference to FIG. 5.

At operation 915, the system generates a patch descriptor corresponding to the patch. For example, the system may encode the patch surrounding the bad pixel into a vector descriptive of pixel information of the patch of pixels. In some cases, the operations of this step refer to, or may be performed by, descriptor component as described with reference to FIG. 5.

At operation 920, the system selects a patch descriptor key corresponding to the patch descriptor from a set of patch descriptor keys in a dictionary. For example, the system (e.g., a camera) may search a dictionary of 'key:value' pairs stored in memory (e.g., where the dictionary may be generated offline, and the 'key:value' pairs correspond to patch descriptor 'keys' and estimation filter 'values'). The patch descriptor key may be selected based on matching the patch descriptor generated at operation 915 with a closest matching patch descriptor key of the dictionary. In some examples, a distance algorithm used by the system to identify the closest matching descriptor key in the dictionary based be based on the method used by the system to encode image patch descriptors (e.g., the method used by a device to encode a patch descriptor, the method used during offline dictionary processes to encode cluster image descriptors, etc.). In some cases, distance algorithms such as the sum of squares, L2 distances, etc. may be used. In some cases, the operations of this step refer to, or may be performed by, dictionary component as described with reference to FIG. 5.

At operation 925, the system identifies a filter corresponding to the patch descriptor key using the dictionary. That is, the system may identify a filter value corresponding to the searched patch descriptor key in the dictionary selected at operation 920. In some cases, the operations of this step refer to, or may be performed by, dictionary component as described with reference to FIG. 5.

At operation 930, the system corrects the bad pixel by applying the filter to the patch. For example, the system may apply the filter identified at operation 925 to the bad pixel at the center of the image patch identified at operation 910 in order to output a corrected image (e.g., an image with the bad pixel having a pixel value adjusted to a corrected pixel value such that broken lines are removed, such that the corrected image appears more natural to an average observer, etc.). In some cases, the operations of this step refer to, or may be performed by, patch correction component as described with reference to FIG. 5.

Moreover, an apparatus, non-transitory computer readable medium, and system for learning based bad pixel correction is described. One or more aspects of the apparatus, non-transitory computer readable medium, and system include receiving an image including a bad pixel; identifying a patch of pixels surrounding the bad pixel; generating a patch descriptor corresponding to the patch; selecting a patch descriptor key corresponding to the patch descriptor from a plurality of patch descriptor keys in a dictionary; identifying a filter corresponding to the patch descriptor key using the dictionary; and correcting the bad pixel by applying the filter to the patch.

Some examples of the method, apparatus, non-transitory computer readable medium, and system further include comparing the patch descriptor to each of the plurality of patch descriptor keys in the dictionary to obtain a similarity value for each of the patch descriptor keys in the dictionary, wherein the similarity value comprises a distance between the patch descriptor and a corresponding patch descriptor key. Some examples further include identifying the patch descriptor key based on the similarity value.

Some examples of the method, apparatus, non-transitory computer readable medium, and system further include encoding pixel values of the patch to obtain the patch descriptor.

Some examples of the method, apparatus, non-transitory computer readable medium, and system further include generating a training patch descriptor for each of a plurality of patches in a set of training images. Some examples further include clustering the plurality of patches based on the training patch descriptor to obtain a plurality of patch clusters. Some examples further include identifying the plurality of patch descriptor keys in the dictionary based on the plurality of patch clusters.

In some aspects, the patch descriptor key comprises a representative image patch or a descriptor of the representative image patch for a corresponding cluster of the plurality of patch clusters.

Some examples of the method, apparatus, non-transitory computer readable medium, and system further include performing a self-supervised learning algorithm on a cluster corresponding to the patch descriptor key to obtain the filter.

Some examples of the method, apparatus, non-transitory computer readable medium, and system further include applying the filter to one or more patches in a corresponding cluster from the plurality of patch clusters to obtain a predicted pixel for each of the one or more patches. Some examples further include comparing the predicted pixel to an actual pixel in a corresponding patch of the one or more patches. Some examples further include updating the filter based on the comparison.

Some examples of the method, apparatus, non-transitory computer readable medium, and system further include identifying a plurality of bad pixels in the image. Some examples further include generating a corrected image by correcting each of the plurality of bad pixels.

Some examples of the method, apparatus, non-transitory computer readable medium, and system further include capturing the image with a camera. Some examples further include presenting the corrected image to a user.

Figure 10:
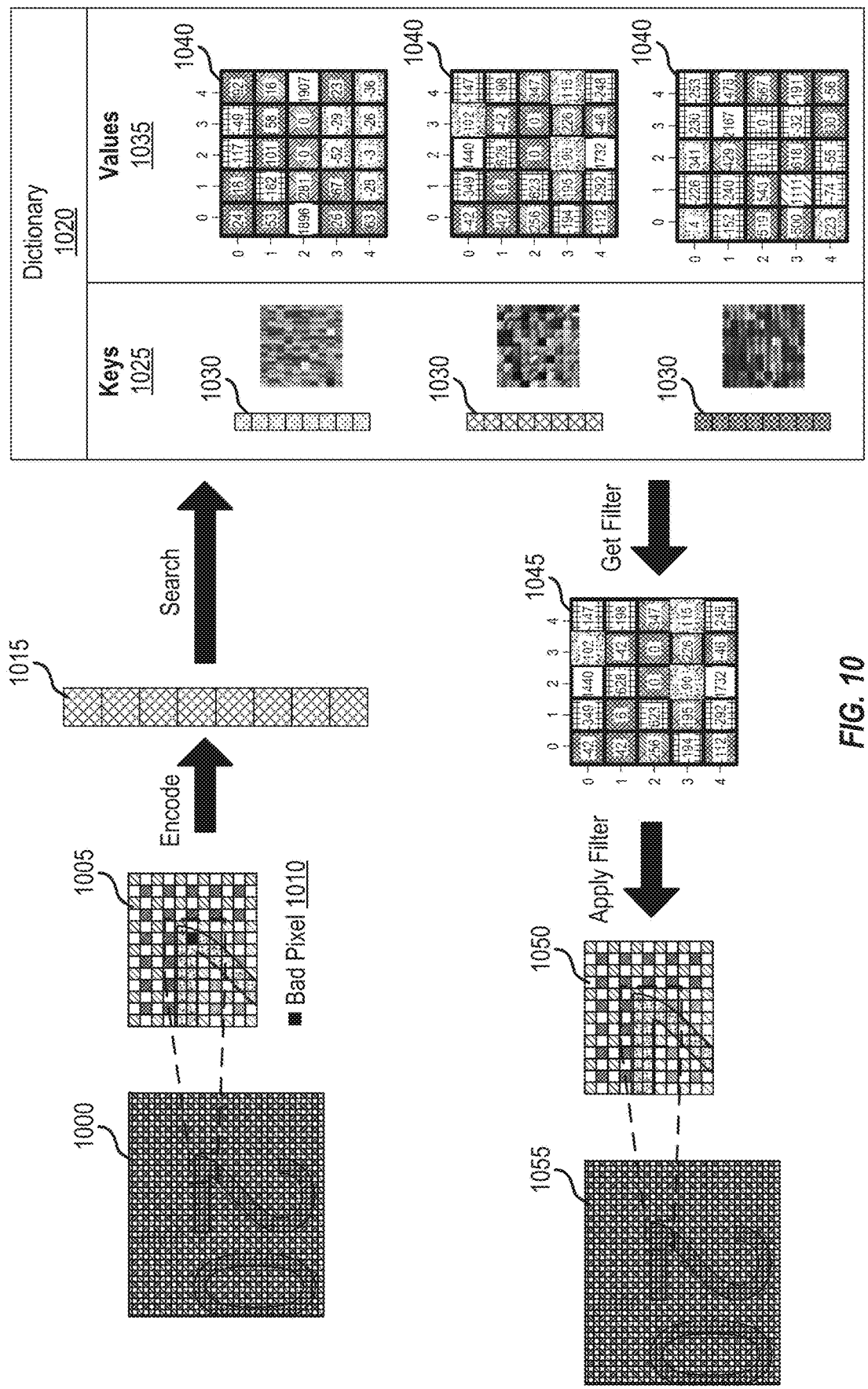
FIG. 10 shows an example of figure description according to aspects of the present disclosure.

FIG. 10 shows an example of figure description according to aspects of the present disclosure. The example shown includes image 1000, patch 1005, patch descriptor vector 1015, dictionary 1020, filtered patch 1050, and corrected image 1055. Patch 1005 is an example of, or includes aspects of, the corresponding element described with reference to FIG. 11. In one aspect, patch 1005 includes bad pixel 1010. Patch descriptor vector 1015 is an example of, or includes aspects of, the corresponding element described with reference to FIG. 11. In one aspect, dictionary 1020 includes keys 1025 and values 1035. In one aspect, keys 1025 includes dictionary patch descriptors 1030. Dictionary patch descriptors 1030 is an example of, or includes aspects of, the corresponding element described with reference to FIG. 11. In one aspect, values 1035 includes dictionary filters 1040. In one aspect, dictionary filters 1040 includes selected filter 1045. Selected filter 1045 is an example of, or includes aspects of, the corresponding element described with reference to FIG. 11.

In FIG. 10, an image patch 1005 is identified from a capture image 1000 (e.g., via looping over image 1000, identifying known bad pixels, and identifying an image patch 1100 surrounding a bad pixel 1010. Image patch 1005 (e.g., a patch 1005 surrounding a bad pixel 1010) is encoded into a patch descriptor vector 1015 (e.g., a vector descriptive of the pixel information of patch 1005). As described herein, the patch descriptor vector 1015 may be used to search a dictionary 1020 including pairs of keys 1025 (e.g., dictionary patch descriptor keys 1030) and values 1035 (e.g., dictionary filters 1040). Using a distance algorithm (e.g., which may be based on how the patch descriptor vector 1015 is encoded, how the dictionary patch descriptors 1030 are encoded, or both), a dictionary patch descriptor 1030 closest to patch descriptor vector 1015 may be searched and identified. Then, a selected filter 1045 may be identified (e.g., where the selected filter 1045 is the value of the 'key:value" pair corresponding to the matching dictionary patch descriptor key 1030). Accordingly, the selected filter 1045 may be applied to the patch 1005 to generate filtered patch 1050 (e.g., which may be used to output a corrected image 1055 including the bad pixel having a corrected pixel value to reduce or remove broken lines, remove other image artifacts, make the corrected image 1055 appear more natural looking to the average observer, etc.).

For example, as described in more detail herein, image patches from several images in a database may be clustered together (e.g., based on similarity of the clustered image patches). Bad pixels may be estimated based on surroundings (e.g., if surroundings are similar, bad pixels of a captured image can be corrected based on the corresponding ground truth "correct" pixel in the center of similar known image patches. For each cluster, a formula is determined (e.g., and learned) to evaluate the center pixel. The formula is in the form of a filter. The filter is estimated to minimize the error between the estimated pixel correction and the ground truth pixel correction (e.g., and parameters of the filter are updated with the learning process). Offline encoding (encoding of image descriptors) may be off the shelf encoding, or how the encoding is performed could be learned. The encoding may take surroundings and encode information into a vector.

At runtime, upon detection of a bad pixel (e.g., when a device reaches a bad pixel during image processing, a vector describing the current patch which surrounds the bad pixel may be calculated. In other words, a patch surrounding the bad pixel, when the bad pixel is detected, may be encoded into a patch descriptor. The device may then go through the dictionary (e.g., search the dictionary) to find the closet key (e.g., to find a patch descriptor key matching the encoded patch descriptor). The device may apply the corresponding solving filter (e.g., the filter value corresponding to the matching patch descriptor key) on the current patch to estimate the value of the bad pixel (e.g., and to correct the bad pixel to generate a corrected output image).

In various examples described herein, illustrated numbers inside shown filters are examples of coefficients that may be multiplied to corresponding pixels in an image patch of a captured image to give the final corrected bad pixel result.

Figure 11:
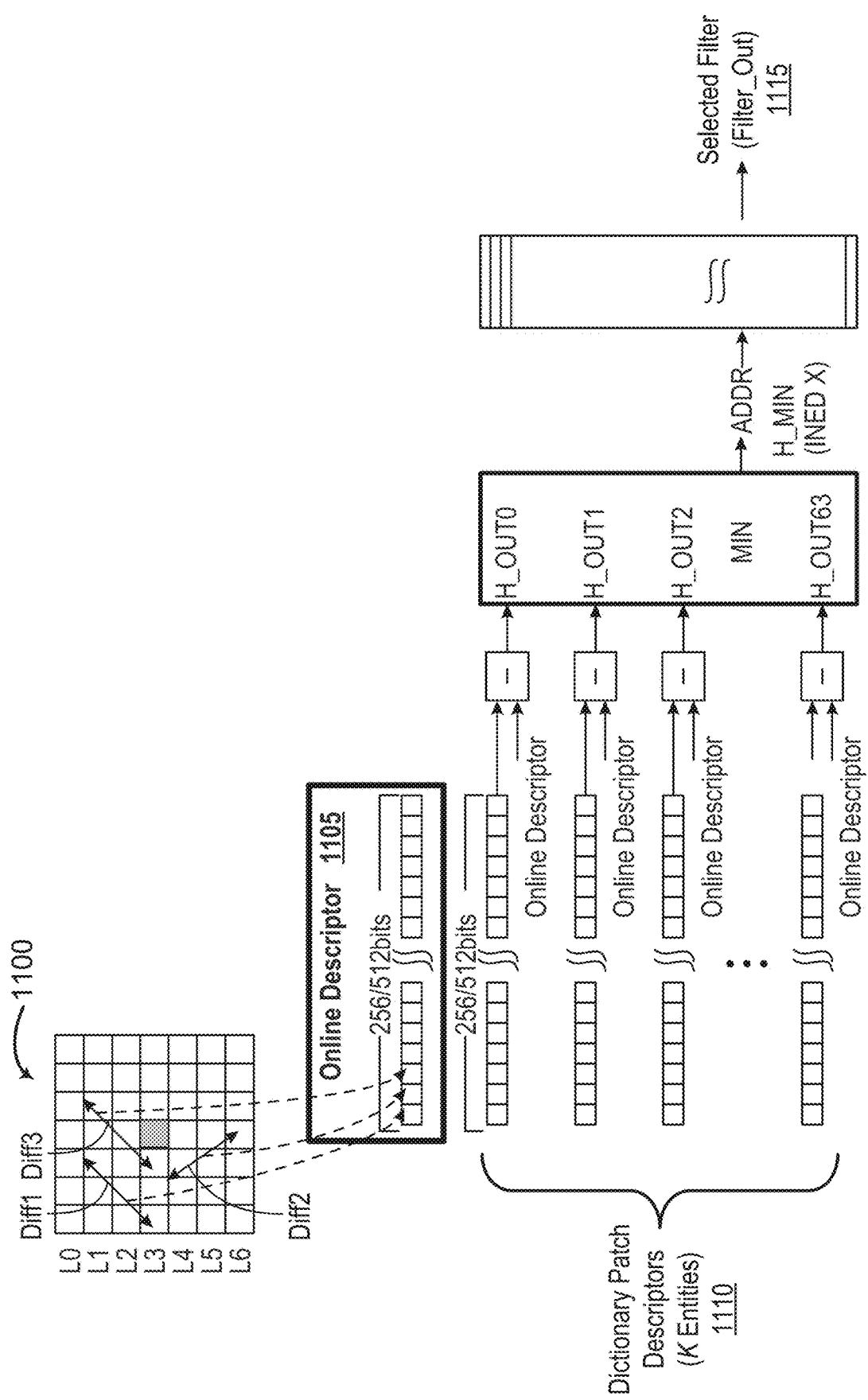
FIG. 11 shows an example of a dictionary look-up hardware implementation according to aspects of the present disclosure.

FIG. 11 shows an example of a dictionary look-up hardware implementation according to aspects of the present disclosure. The example shown includes patch 1100, patch descriptor vector 1105, dictionary patch descriptors 1110, and selected filter 1115. Patch 1100 is an example of, or includes aspects of, the corresponding element described with reference to FIG. 10. Patch descriptor vector 1105 is an example of, or includes aspects of, the corresponding element described with reference to FIG. 10. Dictionary patch descriptors 1110 is an example of, or includes aspects of, the corresponding element described with reference to FIG. 10. Selected filter 1115 is an example of, or includes aspects of, the corresponding element described with reference to FIG. 10.

In FIG. 11, an image patch 1100 (e.g., a patch 1100 surrounding a bad pixel shown as a gray pixel in the patch 1100) is encoded into a patch descriptor vector 1105 (e.g., a vector descriptive of the pixel information of patch 1100). As described herein, the patch descriptor vector 1105 may be used to search a dictionary of, for example, K entries of dictionary patch descriptors 1110. Using a distance algorithm (e.g., which may be based on how the patch descriptor vector 1105 is encoded, how the dictionary patch descriptors 1110 are encoded, or both), a dictionary patch descriptor 1110 closest to patch descriptor vector 1105 may be searched and identified. Then, a selected filter 1115 may be identified (e.g., where the selected filter 1115 is the value of the 'key:value" pair corresponding to the matching dictionary patch descriptor key 1110).

The dictionary existence (e.g., the generation of the dictionary offline) allows and image processing system, such as a camera, to maintain flexibility (e.g., as the dictionary may be is stored in camera memory rather than being hardwired implemented). In real-time, each image patch may be converted to a vector (e.g., a patch descriptor) which describes the image patch. This image patch descriptor vector may then be looked up in the dictionary (e.g., or searched for a match or the closest match). The filter (e.g., the dictionary value) with the closest key to the patch's descriptor vector may be then applied to the image patch in order to estimate the corrected bad pixel value (e.g., and the bad pixel, which may be at the center of the image patch, may be corrected for generation of a corrected image).

FIG. 11 shows and example hardware implementation for illustrative purposes, and is not intended to be limiting in terms of the scope of the present disclosure.

Accordingly, the apparatus and techniques described above may improve image processing system development time and effort. For instance, other (e.g., earlier) bad pixel correction algorithms may be developed for specific CFAs (e.g., such as Bayer, Quad-Bayer/TetraCell, NonaCell, etc.) with tailor made filters. The apparatuses and techniques described herein are not CFA specific and enable production and utilization of the correct filters for each CFA based on the training database (e.g., therefore dramatically reducing development time and effort).

Moreover, quality of bad pixel correction systems are improved via the described apparatuses and techniques. Directional based bad pixel correction is limited to simple CFAs and quantized directions (e.g., where as the present disclosure enables bad pixel correction for all possible patch content). Further, versatility may be improved. For instance, as the bad pixel correction process is the same regardless of the dictionary content, the described bad pixel correction techniques can be updated post silicone, and by that allowing flexibility which does not exist with other image processing algorithms.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
receiving an image including a bad pixel;
identifying a patch of pixels surrounding the bad pixel;
generating a patch descriptor corresponding to the patch;
selecting a patch descriptor key corresponding to the patch descriptor from a dictionary including pairs of patch descriptor keys and filters;
comparing the patch descriptor to each of a plurality of patch descriptor keys in the dictionary;
obtaining a similarity value for each of the plurality of patch descriptor keys in the dictionary based on a result of the comparison, wherein the similarity value comprises a distance between the patch descriptor and a corresponding patch descriptor key;

identifying the selected patch descriptor key based on the similarity value;

identifying a filter paired with the identified patch descriptor key among the pairs of patch descriptor keys and filters in the dictionary; and correcting the bad pixel by applying the identified filter to the patch.

2. The method of claim 1, wherein the patch descriptor is obtained by encoding pixel values of the patch.

3. The method of claim 1, further comprising:

generating a training patch descriptor for each of a plurality of patches in the set of training images;

clustering the plurality of patches based on the training patch descriptor to obtain a plurality of patch clusters; and identifying a plurality of patch descriptor keys in the dictionary based on the plurality of patch clusters.

4. The method of claim 3, wherein:

the selected patch descriptor key comprises a representative image patch or a descriptor of the representative image patch for a corresponding cluster of the plurality of patch clusters.

5. The method of claim 3, further comprising:

performing a self-supervised learning algorithm on a cluster corresponding to the selected patch descriptor key to obtain the filter.

6. The method of claim 3, further comprising:

obtaining a predicted pixel each of the one or more patches by applying a filter to one or more patches in a corresponding cluster from the of patch clusters;

comparing the predicted pixel to an actual pixel in a corresponding patch of the one or more patches; and updating the filter based on the comparison.

7. The method of claim 1, further comprising:

identifying a plurality of bad pixels in the image; and generating a corrected image by correcting each of the plurality of bad pixels.

8. The method of claim 7, further comprising:

capturing the image with a camera; and presenting the corrected image to a user.

9. An apparatus for image processing, comprising:

a patch selection component configured to select a patch surrounding a bad pixel in one image;

a dictionary component configured to: compare a patch descriptor to each of a plurality of patch descriptor keys in a dictionary learned through a set of images each different from the one image, obtain a similarity value for each of the plurality of patch descriptor keys in the dictionary based on a result of the comparison, identify a patch descriptor key based on the similarity value, and identify a filter corresponding to the patch descriptor key based on the patch from the dictionary, wherein the similarity value comprises a distance between the patch descriptor and a corresponding patch descriptor key; and a patch correction component configured to correct the bad pixel by applying the filter to the patch.

10. The apparatus of claim 9, further comprising:

a camera configured to capture the one image.

11. The apparatus of claim 9, further comprising:

a descriptor component configured to generate the patch descriptor for the patch, wherein the patch descriptor key is selected based on the descriptor.

12. The apparatus of claim 9, further comprising:

a clustering component configured to cluster a plurality of patches to obtain a plurality of patch clusters, wherein the patch descriptor key corresponds to one of the plurality of patch clusters.

13. The apparatus of claim 9, further comprising:

a filter training component configured to perform a self-supervised learning algorithm on a cluster of patches corresponding to the patch descriptor key to obtain the filter.

* * * * *